United States Patent [19]
Rosser

[11] Patent Number: 5,319,442
[45] Date of Patent: Jun. 7, 1994

[54] OPTICAL INSPECTION PROBE

[75] Inventor: John I. Rosser, North Woodchester, United Kingdom

[73] Assignee: Renishaw Metrology Limited, Gloucestershire, United Kingdom

[21] Appl. No.: 927,960

[22] Filed: Aug. 11, 1992

[30] Foreign Application Priority Data

Aug. 20, 1991 [GB] United Kingdom ............... 9117974

[51] Int. Cl.$^5$ .......................................... G01B 11/00
[52] U.S. Cl. .................................. 356/375; 250/561; 901/47
[58] Field of Search ............... 356/375, 373; 358/107; 250/561; 901/47

[56] References Cited

U.S. PATENT DOCUMENTS 4,970,653 11/1990 Kenue .

FOREIGN PATENT DOCUMENTS 60194302 10/1985 Japan .

OTHER PUBLICATIONS

Metalworking Production, The Journal for Production Engineers, Oct. 1989, pp. 1-32.

*Primary Examiner*—F. L. Evans
*Attorney, Agent, or Firm*—Oliff & Berridge

[57] ABSTRACT

An optical inspection probe, used on a coordinate measuring machine, includes a sensing module having a CCD array and an imaging module releasably mountable thereon. The position of a feature on the surface is measured using the probe by calculating the instant of time at which an image of the feature will pass across a predesignated pixel $Q_c$ of the array. The calculation is performed on the basis of the relative velocity of the probe and the surface as determined from two consecutively scanned image frames of the CCD array. The probe may be used to determine, for example, the position of an edge of a surface by moving the probe laterally with respect to the surface or, may be used to measure the position of a predetermined height of a surface by projecting a light beam onto the surface at an angle to the optical axis and measuring the position of the resulting spot on the surface.

12 Claims, 3 Drawing Sheets

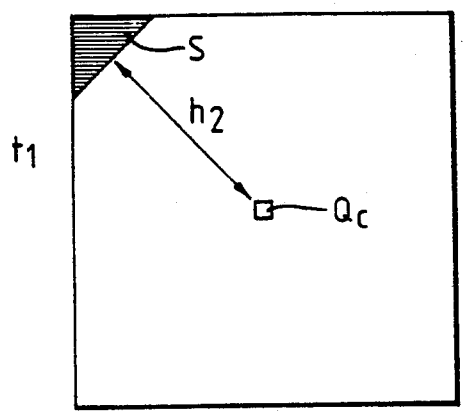
Fig. 4A.
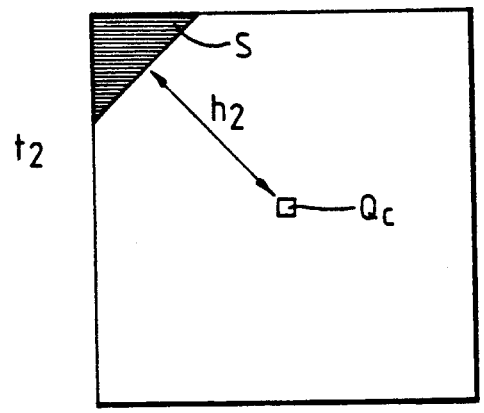
Fig. 4B.
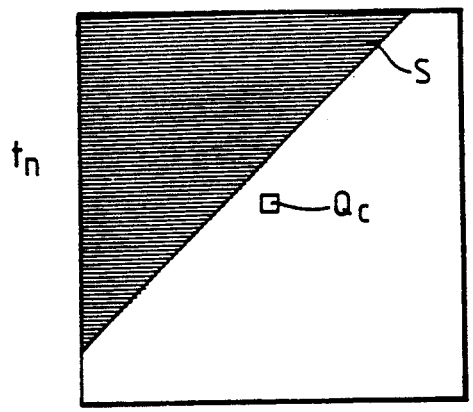
Fig. 4C.
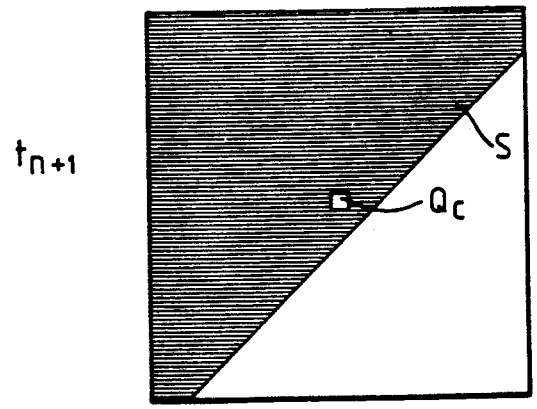
Fig. D.

OPTICAL INSPECTION PROBE

BACKGROUND OF THE INVENTION

1. Field of the Invention

The present invention relates to an optical probe which in use is mounted on the movable arm of a coordinate positioning machine to enable the machine to determine the position of a surface. More particularly, the invention relates to a non-contact probe which, upon detection of a surface, emits a trigger signal which is sent to the machine control to cause it to record the position of the movable arm at the instant of trigger, thereby to determine the position of the surface.

2. Description of Related Art

It is known to provide a non-contact trigger probe in the form of a video camera which projects an image of a workpiece to be measured onto a charge-coupled device (CCD) array. The CCD array consists of a large number of pixels each of which outputs an electrical signal corresponding to the intensity of light incident thereon. The known video trigger probe emits a trigger signal indicating detection of the edge of a surface when the value of the output signal of a predesignated pixel passes above or below a threshold level. The problem with such a known probe is that the image processing circuitry in the probe sequentially scans each pixel in the CCD array; the time period for a single scan of the entire array being of the order of 20ms. There is therefore a possible time band of 20ms during which the output of the predesignated pixel may have passed the threshold level. The accuracy of a measurement made with this known probe is therefore limited to the speed at which the image processing circuitry may scan the entire CCD array.

SUMMARY OF THE INVENTION

The present invention, seeks to ameliorate this problem by detecting the position of a feature on a surface using a video probe which focuses an image of the workpiece onto an array (e.g. a charge-coupled transistor (CCT) or a CCD array), and which determines the position of the feature by anticipating the instant of time at which the image of the said feature passes across a predesignated pixel in the array, in order to emit a trigger signal at the said instant of time.

Accordingly the present invention provides an optical inspection probe for use on a movable arm of a coordinate positioning machine to determine the position of a feature of a surface, the probe comprising:

a sensing device having a light sensitive array which includes a plurality of discrete light sensitive cells, each of which outputs a signal corresponding to the intensity of light incident thereon;

an imaging device having one or more optical components for imaging said feature on said array; and processing means for a) analysing said image by, inter alia, sequentially scanning each cell of said array to determine the value of each said signal, a single scan of said array constituting an image frame; and b) determining in advance, from two or more said image frames, the instant of time at which the image of said feature will reach a predetermined cell of said array, and generating at said instant a trigger signal for instructing a central system of said machine to determine the position of the movable arm relative to said feature of said surface.

The present invention is applicable to detection in which the probe detects e.g. the edge of a surface by moving substantially parallel to the surface, or in which the height of the surface is determined by moving the probe substantially perpendicular to the surface. Where the height of the surface is determined, the feature is provided by a light pattern (such as a spot) on the surface generated by a light beam which extends at an angle to the optical axis of the probe; the position of incidence of the pattern on the surface moves laterally with respect to the optical axis as the probe approaches the surface substantially in a direction along said axis.

Preferably, the speed and relative direction of travel of the probe and workpiece will be determined using the image processing circuitry of the probe for example, by determining from consecutive image frames of the array the relative displacement of the probe and surface; this obviates the need to provide any inputs to the probe from the machine control. Alternatively however, the speed and relative direction of travel of the probe and workpiece may be input into the probe from the machine control

BRIEF DESCRIPTION OF DRAWINGS

Embodiments of the present invention will now be described, by way of example, and with reference to the accompanying drawings in which:

FIGS. 4a-4d illustrate a probing operation according to a first embodiment of the present invention;

Referring now to FIG. 1, a video probe 10 is supported on the quill 12 of a coordinate measuring machine, and is thereby movable in three directions X,Y,Z relative to a table 14 of the machine. A machine control (not shown) controls movement of the quill 12 (and thus the probe 10) relative to the table; coordinate measuring machines are well known per se and will not be described further. The probe 10 comprises an optical imaging device in the form of an imaging module 16 for imaging e.g. a feature of a workpiece surface W onto an array 18 (which may be a CCT or a CCD array) provided within the probe 10, which includes image processing circuitry 15. The imaging module 16 is in this case a convex lens, however other and more complex modules may be employed in accordance with the required measuring operation.

Referring now to FIG. 2, the CCD array 18 is provided in a sensing module to which an imaging module may be releasably connectable in the manner described in EP 501710A. The array 18 comprises a plurality of pixels 20 each of which generates a electrical signal in dependence upon the intensity of light incident thereon. The data from each pixel (in the form of the aforementioned electrical signals) is acquired by the image processing circuitry 15 of the probe by sequentially scanning each row $r_1, r_2 \ldots r_n$ of the CCD array 18.

Referring now to FIG. 3, the scanning of the CCD array 18 generates a signal having a synchronising pulse $p_s$ followed by a data stream comprising an individual analogue signal for each pixel $Q_n$ in the row $r_n$. Each of the analogue signals $Q_n$ (corresponding to a light intensity) is typically converted to an 8-bit digital signal, which may thus have one of $2^8$ values. The image processing circuitry 15 of the video probe then determines from the value of each 8-bit number whether the light intensity incident upon each pixel is such as to represent an image of the surface of the workpiece (i.e. if the value of the 8-bit number exceeds a predetermined value then the light intensity incident upon a given pixel is deemed to have been reflected off the surface to be detected). Such processing circuitry is well known per se.

Referring now to FIGS. 4a–d an operation in which of a surface (in this case an edge) is inspected will now be described. In FIG. 4a the image of the surface S of the workpiece W is focused upon the CCD array 18. It is desired to determine the instant of time at which the image of the edge of the surface S will pass across the centre pixel $Q_c$. This instant will correspond to a predetermined threshold value of, for example: the value of the 8-bit number representing the light intensity incident upon $Q_c$; a predetermined magnitude of change in the value of the 8-bit number from one scan of the array 18 to the next; or a predetermined rate of change in the value of the 8-bit number. FIG. 4a is an illustration of the probing operation at a time $t_1$ at which the distance between the surface S and the centre pixel $Q_c$ (in the direction of relative motion of the surface S and probe 10) is $h_1$. FIG. 4b illustrates the situation at a time $t_2$, the time interval $t_2 - t_1$ being equal to a single scanning period T for the CCD array 18. The distance between the surface S and the centre pixel $Q_c$ is now $h_2$. From the image frames represented in FIGS. 4a and 4b, the image processing circuitry may determine, the distances $h_1$, and $h_2$, and thus the distance (x) and direction of relative travel of the probe and the surface S over the time interval $t_2 - t_1 (=T)$. By using this information in a best fit operation the relative velocity of the probe and the surface S may be determined.

Figure 1:
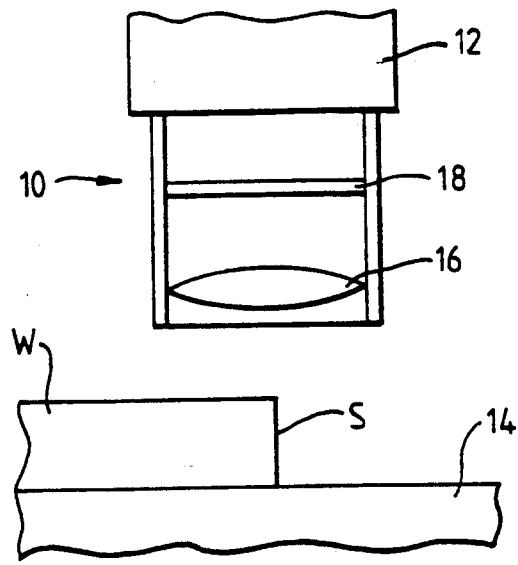
FIG. 1 shows a first type of video camera mounted to a coordinate measuring machine.
Figure 2:
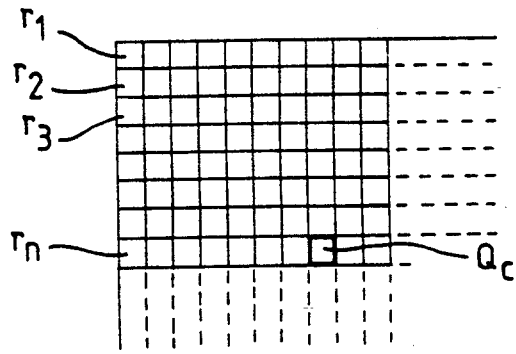
FIG. 2 shows a representation of a CCD array in the probe of FIG. 1.
Figure 3:
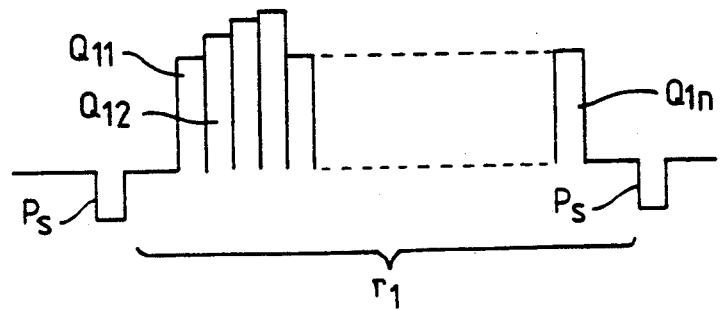
FIG. 3 is a signal diagram showing the output of a row of pixels in the CCD array of FIG. 1.

$$x = h_2 - h_1, \text{ and } v = x/T$$

FIG. 4c is an image frame at time $t_n$, the time interval $t_n - t_2$ once again being equal to $(n-2)$ multiples of the scanning period T of the CCD array 18. It can be seen from FIG. 4c and 4d that during the time interval $t_{n+1} - t_n$, the image of the edge of the surface S has passed completely over the centre pixel $Q_c$, and that the centre pixel $Q_c$ now lies some distance beyond the image of the edge of the surface S.

Clearly, the instant of time at which the edge of the surface S passed over the centre pixel $Q_c$ is at a time $t_e$, which lies between the times $t_n$ and $t_{n+1}$, where:

$$t_e = t_n + \Delta t$$

Now at time $t_2$ the distance from the edge of the surface S to the centre pixel $Q_c$ is $h_2$. This distance $h_2$ may be expressed in the following way:

$$h_2 = (n-2)x + e$$

where:

x is the distance of relative travel between the probe and surface over a single scanning period T;

e is the distance of relative travel between the probe and surface over the time interval $\alpha t$.

Since $h_2$, $(n-2)$ and x are known, e may be calculated.

Assuming the velocity v remains constant:

$$\alpha t = e/v$$

The image processing circuitry of the probe 10 should therefore output a trigger signal at a time interval $(n-2)T + \alpha t$ after time $t_2$, which is then accurately indicative of the instant of time at which the edge of the surface S passes over the centre pixel $Q_c$.

However, the image processing required to perform this calculation takes a significant amount of time in relation to the magnitude of the time interval $[(n-2)T + \alpha t]$. As a result, by the time the value of $[(n-2)T + \alpha t]$ has been calculated, a number (m) of further scans of the array 18 have been completed. The value of $[(n-2)T + t]$ is therefore not generated until time $t_{2+m}$, by which time the interval $t_e$ to the event has been has been reduced by mT, and is therefore equal to:

$$[(n-2)T + \Delta t] - mT$$

The time required to calculate the value $[(n-2)T + \Delta t]$ is dependent upon factors such as the direction of relative movement of the surface and the array, and is therefore variable. The value of m should therefore ideally be determined on each occasion.

The determination of the instant of trigger is performed $(n-2)$ frames in advance of the "event frame" to allow sufficient time (a) for performing the processing to determine the value of $[(n-2)T + \Delta t)$, and (b) to correct for the processing time required: i.e. to generate the value of $[(n-m-2)T + \Delta t)$.

However the calculation of $[(n-m-2)T + \Delta t)$ must assume a constant velocity in order to be performed in advance. Any variation in velocity after time $t_2$ will therefore be a source of error. This may be minimised by performing a calculation after each frame (i.e. at times $t_1$, $t_2$, $t_3$ . . . etc), and using only the value of $[(n-m-2)T + \Delta t]$ obtained from the processing sequence at which it is determined that insufficient time remains before the instant $t_e$ to generate any further value of $[(n-m-2)T + \Delta t)$ and output the trigger signal at the correct time.

In a modification of the present invention, the velocity vector representing the relative velocity between the surface S and the probe 10 may be input directly into the image processing circuitry from the machine control. However, it is desirable to operate the probe exactly as a conventional touch-trigger probe so that the video probe is functionally interchangeable therewith. It is therefore preferable to avoid this if possible.

The first embodiment of the present invention related to a non-contact trigger probe whose purpose was, for example, to determine the position of the edge of a surface when travelling laterally with respect to the plane of the surface. A second embodiment of the present invention provides a non-contact trigger probe for determining the position of a predetermined height above a plane surface.

Figure 5:
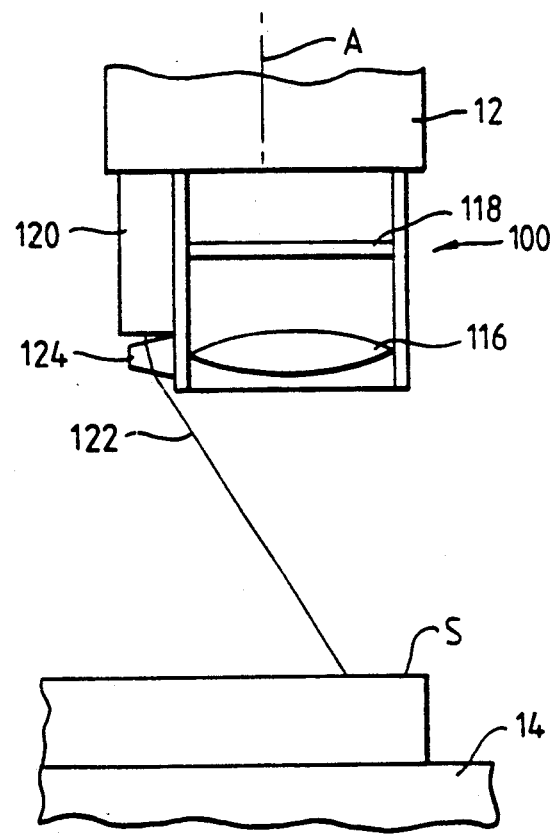
FIG. 5 shows a second type of video camera mounted to a coordinate measuring machine.

Referring now to FIG. 5, a probe 100 is supported on the movable arm or quill 12 of a coordinate positioning machine for movement in the x,y,z directions relative to a table 14. As with the first embodiment, the probe 100 comprises an imaging module having one or more optical imaging components such as a lens 116, and an array 118 (e.g. a CCD array) onto which an image is focused. Additionally, the probe comprises image processing circuitry 115, a light source, typically a laser 120 (an LED or other source may be used) which emits a beam 122 of light. The beam 122 is projected at an angle relative to the axis A of the probe 100, and in this example this is achieved by passing the beam 122 through a prism 124. The beam 122 is incident upon a surface S, and consequently illuminates the surface S with a spot 126. The angle of deviation of the beam 122 relative to the axis of the probe 100 is such that when an image of the spot 126 on the CCD array 118 passes across the centre pixel $Q_c$ of the array 118, the quill 12 is at a height above the surface S at which is desired to produce a trigger signal. The spot 126 provided by the light beam 122 is thus the "feature" to be inspected.

Figure 6:
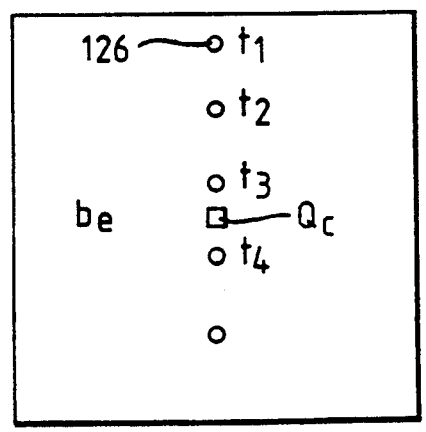
FIG. 6 illustrates a probing operation according to a second embodiment of the present invention.

FIG. 6 shows the position of the image of the spot 126 on the CCD array 118 at time $t_1, t_2, t_3$, and $t_4$, each of which correspond to instants at which a scanning operation of the CCD array 118 has been completed. It can be seen from the FIG. 6 that the incident of time $t_e$ at which the image of the spot 126 passes across the centre pixel $Q_c$ occurs after time $t_3$, but before time $t_4$. Therefore, in order to output a trigger signal at the correct instant of time $t_e$, the anticipation technique described in relation to the first embodiment of the present invention is employed here.

The processing method by which a trigger signal is output at time $t_e$ is exactly as described in relation to the first embodiment of the present invention and will not be described further.

I claim:

1. An optical inspection probe for use on a movable arm of a coordinate positioning machine to determine a position of a feature of a surface, the probe comprising:
   a sensing device having a light sensitive array which includes a plurality of discrete light sensitive cells, each of which outputs a signal corresponding to the intensity of light incident thereon;
   an imaging device having one or more optical components for imaging said feature on said array;
   processing means for
   a) analysing said image by, inter alia, sequentially scanning each cell of said array to determine the value of each said signal, a single scan of said array constituting an image frame; and
   b) determining in advance, from two or more said image frames, an instant of time at which the image of said feature will reach a predetermined cell of said array, and for generating at said instant a trigger signal for instructing a control system of said machine to determine a position of the movable arm relative to said feature of said surface.

2. An optical inspection probe according to claim 1 wherein the processing means includes means for determining, from at least to of said image frames, the speed and direction of relative travel of the probe and the surface, and calculating from speed and direction a time interval between the second of said image frames and said instant of time.

3. An optical inspection probe according to claim 2 wherein the processing means includes means for determining the processing time required to calculate said time interval, and for comparing said time interval with said processing time in order to determine whether a further calculation of said time interval may be made before said instant of time, and where sufficient time remains, performing a further calculation of said time interval.

4. An optical inspection probe according to claim 3, wherein said processing means includes means for generating a corrected value of said time interval by subtracting the processing time therefrom.

5. An optical inspection probe according to claim 1, wherein the probe has an optical axis extending orthogonal to said array and illuminating means for generating a light beam to illuminate an area of said surface, wherein said light beam extends at an angel to the optical axis.

6. An optical inspection probe according to claim 1, wherein said sensing device and said imaging device are provided in the form of a sensing module and an imaging module and means are provided for releasably and repeatably retaining said imaging module on said sensing module.

7. A method of inspecting a surface to determine a position of a feature thereon, using a coordinate positioning machine having an optical inspection probe connected to a movable arm of the machine, the optical inspection probe including an array of light sensitive elements each of which outputs a signal corresponding to an intensity of light incident thereon, and one or more optical elements for imaging said feature on said array, the method comprising the steps of:
   analysing said image by, inter alia, sequentially scanning each light sensitive element of said array to determine a value of each said signal, a single scan of said array constituting an image frame;
   determining in advance, from two or more said image frames, an instant of time at which an image of said feature will reach a predetermined cell of said array, and generating at said instant a trigger signal for instructing a control system of said machine to determine a position of the movable arm relative to said feature of said surface.

8. The method according to claim 7, further comprising the step of generating, from a light source in said probe, a bema of light which is incident upon siad surface, and extends in a direction non-parallel to a direction of relative movement of said surface and said arm.

9. A method of operating an optical inspection probe for use on a movable arm of a coordinate positioning machine in determining a position of a feature of a surface, the probe comprising: a light sensitive array including a plurality of discrete light sensitive cells, each cell outputting a signal corresponding to an intensity of light incident thereon, and an imaging device having at least one optical component for imaging said feature on said array, the method comprising the steps of:
   analysing said image by sequentially scanning each cell of said array to determine a value of each said signal, a single scan of said array constituting an image frame; and
   determining in advance, from two or more of said image frames, an instant of time at which an image of said feature will reach a predetermined cell of said array, and generating at said instant a trigger signal for instructing a control system of said coordinate positioning machine to determine a position of the movable arm relative to said feature of said surface.

10. The method according to claim 9, further comprising the steps of determining, from at least two of said image frames, a speed and direction of relative travel of the probe and the surface, and calculating from said speed and direction a time interval between the second of said image frames and said instant of time.

11. The method according to claim 10, further comprising the steps of determining the processing time required to calculate said time interval and comparing said time interval with said processing time in order to determine whether a further calculation of said time interval may be made before said instant of time, and where sufficient time remains, performing a further calculation of said time interval.

12. The method according to claim 11, further comprising the step of generating a corrected value of said time interval by subtracting the processing time therefrom.

* * * * *